United States Patent Office 3,067,169
Patented Dec. 4, 1962

3,067,169
HEAT-STABLE POLYCONDENSATION PRODUCTS
Heinrich Krimm, Krefeld-Bockum, and Hermann Schnell, Krefeld-Uerdingen, Germany, assignors to Farbenfabriken Bayer Aktiengesellschaft, Leverkusen, Germany, a corporation of Germany
No Drawing. Filed Mar. 3, 1958, Ser. No. 718,414
Claims priority, application Germany Mar. 2, 1957
19 Claims. (Cl. 260—46.5)

Heat-stable polycondensation products. This invention is concerned with heat-stable polycondensation products and, more particularly, is concerned with polycondensation products containing the radicals of bifunctional organic silicon compounds as recurring units in the chains.

The known terephthalic acid polyesters of dihydroxydiaryl alkanes are very heat-stable materials which, nevertheless, can scarcely be processed when high temperatures are required because their melting points are above their decomposition temperatures.

We have now found that exceptionally heat-stable polycondensation products which can be easily heat processed and, at the same time, have a good thermal stability are obtained when mixtures of bifunctional organic silicon compounds, such as bifunctional dialkyl, diaryl or mixed silanes, and aromatic p-dicarboxylic acids, or their functional derivatives, are reacted with aromatic dihydroxy compounds.

Thus, the new polycondensation products contain, as recurring units in the chain, radicals of compounds selected from the group consisting of dialkyl, diaryl and mixed alkyl-aryl substituted silicic acids, of aromatic p-dicarboxylic acids and of aromatic dihydroxy compounds.

While the thermal stability of the products produced according to the invention is unusually high—it extends up to temperatures of 400° C.—it is possible to vary the melting or softening points of the products within wide limits, particularly by choice of suitable mixture ratios between the aromatic dicarboxylic acids and the bifunctional organic silicon compounds and also to a lesser degree, by the choice of the aromatic dihydroxy compounds.

Suitable bifunctional organic silicon compounds are, dialkyl and diaryl and mixed alkyl and/or aryl substituted silicic acids and dihalides and diesters thereof such as dimethyl-, diethyl- and diphenyl-dihydroxysilane, methylethyl-, methylphenyl-, and ethyphenyl-dihydroxysilane, dimethyl-, diethyl-, diphenyl-, methylethyl-, methyl- phenyl- and ethylphenyl- difluoro-, dichloro-, and dibromosilane, and dimethyl-, diethyl-, diphenyl-, methylethyl-, methylphenyl-, and ethylphenyl-dimethoxy-, diethoxy-, and diphenoxysilane.

Suitable aromatic p-di-carboxylic acids for the process according to the invention are, for example, terephthalic acid, diphenyl-4,4'-dicarboxylic acid, diphenylmethane-4,4'-dicarboxylic acid and naphthalene-1,4-, 1,5- and 2,6-dicarboxylic acid. It is preferable not to use the free acids for the reaction but rather the reactive derivatives, such as the corresponding acid dihalides, e.g. dichlorides, dibromides and diiodides, the dialkyl esters and the diaryl esters.

Aromatic dihydroxy compounds (or diphenolic compounds) which are suitable for use in practicing the processes of this invention are, for example, hydroquinone, 2,3,5,6-tetrachlorohydroquinone, pyrocatechol, 1,4-, 1,5-, and 2,6-dihydroxynaphthalene, 4,4'-dihydroxybiphenyl, and especially bisphenols (bis(hydroxyaryl)alkanes) such as 4,4'-dihydroxydiphenylmethane (bis(4-hydroxyphenyl)methane), 1,2 - bis(4 - hydroxyphenyl)ethane, 1,1-bis-(4-hydroxyphenyl)ethane, 2,2-bis(4-hydroxyphenyl)propane (bisphenol A, also called 4,4'-isopropylidenediphenol), 2,2-bis(4-hydroxy-3,5-dichlorophenyl)propane, 2,2-bis(4-hydroxyphenyl)butane, 1,1-bis(4 - hydroxyphenyl)butane, 2,2-bis(4-hydroxyphenyl)pentane, 3,3-bis(4-hydroxyphenyl)pentane, 1,1 - bis(4 - hydroxyphenyl)cyclohexane, bis(4-hydroxyphenyl)phenylmethane, 1,1-bis(4-hydroxyphenyl)-1-phenylethane, bis(4 - hydroxyphenyl)-sulphide, bis(4-hydroxyphenyl)sulphoxide, bis(4-hydroxyphenyl)sulphone, and 4,4'-dihydroxybenzophenone.

For the production of the new mixed condensation products one can, for example, heat a mixture of a dihalide of an aromatic p-dicarboxylic acid and an organic dihalosilane with an aromatic dihydroxy compound whereby the corresponding hydrogen halide is split off. In order to prevent side-reactions, it is preferable to work under controlled conditions and to react the above-mentioned compounds, with one another, for example, in the presence of hydrogen halide-binding compounds, such as pyridine, dimethyianiline or other tertiary amines and possibly with the addition of inert solvents such as benzene, toluene, methylene chloride or chloroform, preferably at room temperature.

Generally, it is, nevertheless, preferable to interesterify a mixture of a diester of the aromatic p-dicarboxylic acid and of a dialkyl, diaryl or mixed dialkoxy or diaroxy (diaryloxy) silane with an aromatic dihydroxy compound whereby the corresponding alcohols or phenols distill off. Such interesterification requires high temperatures, for example, about 200 to about 400° C.

With the use of very high temperatures, catalysts are unnecessary. On the other hand, in the presence of acid or, better, basic catalysts, considerably lower temperatures suffice. Suitable catalysts are, for example, toluene sulphonic acid, zinc chloride, lead ores or cation exchangers, preferably alkali or alkaline earth metals, oxides, hydroxides, hydrides or alcoholates, zinc oxide and lead oxide and especially the alkali or alkali earth metal salts of the aromatic dihydroxy compounds used.

To increase the stability of the products at higher temperatures, it may be expedient to neutralise the effect of the basic catalysts by the addition of neutralising means towards the end of the condensation or after the termination of the interesterification. For this purpose, a large number of base-binding organic and inorganic materials are suitable for example, aromatic sulphoacids, such as p-toluene sulphonic acid, organic acid halides, such as stearic acid chloride, butyric acid chloride, benzoyl chloride and toluene sulphonyl chloride, organic chlorocarboxylic acid esters, such as phenyl chloroformic acid ester, chloroformic acid ester of 4-hydroxy-diphenyl, and bis-chloroformic acid esters of bis(monohydroxyaryl)-alkanes, dialkyl sulphates, such as dimethyl sulphate and dibutyl sulphate, organic chloro compounds, such as benzyl chloride and ω-chloroacetophenone, as well as acid salts of polybasic inorganic acids, such as ammonium bisulphate. Especially suitable are base-binding substances which are fluid at the interesterification temperatures in high vacuum, since, with these substances, a possible excess over the basic catalysts to be neutralised can be removed from the melt in a simple manner. To this group of substances belong from the above-mentioned compounds, for example, dimethyl sulphate, chloroformic acid phenyl ester and benzoyl chloride.

For the production of products with a limited chain length it is sometimes advantageous to use chain-length terminating agents. Suitable compounds are, for example, monofunctional, aromatic hydroxy compounds, such as phenol, cresol and p-tert-butylphenol, or mono functional trialkyl or triaryl silanes, such as trimethylchlorosilane, triphenylchlorosilane, trimethylethoxysilane, triphenylethoxysilane, trimethylphenoxysilane and triphenylphenoxysilane.

If desired, softeners, filling materials, dyestuffs and pigments may be added to the new polycondensation products.

The possibility of the formation of homogenous products from the above-mentioned components was not to be seen in advance since, amongst other things, it has as the preliminary condition similar reaction properties to the mixture components to be condensed with the aromatic dihydroxy compounds. The materials to be reacted with the aromatic dihydroxy compounds are, however, of such different types that it could not be expected with certainty that they would mutually react. Thus, for example, it would have to be reckoned with that terephthalic acid derivatives or derivatives of other aromatic p-dicarboxylic acids react considerably quicker with the aromatic dihydroxy compounds than the silicon compounds. However, a non-uniform mixture of the insoluble and non-melting terephthalates of the aromatic dihydroxy compounds with the condensation products of the organic silicon compounds wtih the aromatic dihydroxy compounds, which condensation products have a limited viscosity at a higher temperature, would result therefrom as the reaction product. It was, therefore, surprising that the reaction of the different types of components in all mixture ratios led to homogenous, more or less high melting viscous products which give clear solutions in many solvents and possess the properties of plastics.

The new materials are soluble in many organic solvents such as, for example, methylene chloride, chloroform, benzene, toluene, xylene, cyclohexanone and dimethyl formamide.

As thermoplastic products they can be worked up from melts, for example, by pressing or injecting, to give extendable fibers and formed bodies of all types. Firmly adhering coatings can be produced on metallic or non-metallic bases by flame spraying.

The following examples are given for the purpose of illustrating the invention:

Example 1

A mixture of 22.8 grams (0.1 mol) 2,2-bis(4-hydroxyphenyl) propane, 12.2 grams (0.05 mol) dimethyl-diphenoxy silane, 15.9 grams (0.05 mol) terephthalic acid diphenyl ester and 0.01 gram of the sodium salt of 2,2-bis(4-hydroxyphenyl)propane is heated with stirring and passing through of nitrogen at 50 mm. pressure and 100° C., whereby the splitting off of the phenol begins. The temperature is then increased stepwise for a period of 2 hours to 300° C. during which the pressure is reduced to 0.9 mm. Finally, the temperature is maintained at 350° C. for another hour. After cooling down, a clear, hard, tough plastic with a softening point of 170–185° C. is obtained. Extendable threads can be drawn from the melt and, by thermoplastic moulding formed bodies of all types can be produced. The product forms clear solutions in methylene chloride, chloroform, benzene, toluene, xylene and cyclohexanone.

Example 2

A mixture of 22.8 grams (0.1 mol) 2,2-bis(4-hydroxyphenyl)propane, 8.0 grams (0.033 mol) dimethyl-diphenoxy silane, 22.2 grams (0.07 mol) terephthalic acid diphenyl ester and 0.01 gram of the sodium salt of 2,2-bis(4-hydroxyphenyl)propane is heated with stirring and passing through of nitrogen at a pressure of 50 mm. and 190° C., whereby the splitting off of phenol commences. The temperature is increased to 350° C. over a period of 2½ hours, while the pressure is reduced to 0.3 mm. After a further ½ hour heating at 350° C. and 0.7 mm., the reaction is finished. A viscous melt is obtained which, after cooling down, gives a clear, tough elastic plastic with a softening point of 270°–280° C. It gives clear solutions in methylene chloride, chloroform dimethyl formamide and cyclohexanone. Extendable threads can be drawn from the melt. By thermoplastic moulding, formed bodies of all types can be produced.

Example 3

A mixture of 22.8 grams (0.1 mol) 2,2-bis(4-hydroxyphenyl)propane, 25.4 grams (0.08 mol) terephthalic acid diphenyl ester, 5 grams (0.022 mol) dimethyl diphenoxy silane and 0.01 gram of the sodium salt of 2,2-bis(4-hydroxyphenyl)propane is heated with stirring and passing in of nitrogen at 50 mm. and 180° C. until the splitting off of phenol begins. The temperature is brought up to 300° C. within a period of 2 hours while the pressure is reduced to 0.4 mm. After heating for one hour at 300° C., the temperature is increased to 400° C. until the melt becomes clear. After cooling down, a hard, tough plastic with a melting point of 315–325° C. is obtained. It dissolves in methylene chloride, chloroform, dimethyl formamide and cyclohexanone.

Example 4

To a solution of 57 grams (0.25 mol) 2,2-bis(4-hydroxyphenyl)propane in a mixture of 200 grams methylene chloride and 41.5 grams (0.525 mol) pyridine, is added at 0° C. within a period of 3 hours a solution of 25.4 grams (0.125 mol) terephthalyl dichloride and 16.25 grams (0.125 mol) dimethyl-dichloro-silane in 100 grams methylene chloride. After standing for several hours at room temperature, the solution of the reaction product is shaken up with dilute hydrochloric acid and water, dried over anhydrous sodium sulphate and concentrated. The remainder of the solvent is removed by heating for an hour at 250° C. and 8 mm. A completely colourless, tough polycondensation product with a softening point of 250–260° C. is obtained. It dissolves in methylene chloride, chloroform, benzene, toluene and dimethyl formamide.

We claim:

1. Process for the production of heat-stable, thermoplastic polycondensation products which comprises reacting in a one-step process 1 mol of material selected from the group consisting of dimethyl, diethyl, diphenyl, methyl-phenyl, and ethyl-phenyl dihydroxy silane, dihalogen silanes and dimethoxy, diethoxy and diphenoxy silane, about 1 to about 4 mol of material selected from the group consisting of aromatic p-dicarboxylic acids, dihalides and diesters thereof, with about 2 to about 5 mol of aromatic dihydroxy compounds with aromatically bound hydroxyl groups, unfused aromatic rings and free of other reactive substituents, at temperatures from room temperature to about 400° C.

2. Process according to claim 1 wherein the aromatic p-dicarboxylic acid compound is selected from the group consisting of terephthalic acid, terephthalic acid dichloride, and terephthalic acid diesters.

3. Process according to claim 1 wherein the aromatic dihydroxy compound is a bis(monohydroxyaryl)alkane.

4. Process according to claim 1 wherein dihalogen silanes and p-dicarboxylic acid dihalides are used and the reaction is carried out in the presence of a tertiary amine as hydrogen halide-binding agent.

5. Process according to claim 4 wherein the hydrogen halide-binding agent is a tertiary amine.

6. Process according to claim 4 wherein the reaction is carried out in the presence of an inert solvent.

7. Process according to claim 6 wherein the inert solvent is a compound selected from the group consisting of benzene, toluene, methylene chloride and chloroform.

8. Process according to claim 4 wherein the reaction is carried out at room temperature.

9. Process according to claim 1 wherein a mixture of material selected from the group consisting of a dihydroxy silane and a dialkoxy and diphenoxy silane, and of a p-dicarboxylic acid diester is used, and the reaction is carried out at a temperature within the range of about 200 to about 400° C.

10. Process according to claim 9 wherein the reaction is carried out in the presence of an interesterifying catalyst.

11. Process according to claim 10 wherein the catalyst is neutralised towards the end of the polycondensation reaction.

12. Process according to claim 1 wherein monofunctional compounds selected from the group consisting of aromatic monohydroxy compounds with an aromatically bound hydroxyl group, trialkyl and triaryl monohydroxy silanes are added which are capable of reacting with the end groups of the chains and thereby terminating the chain lengths.

13. Process according to claim 12 wherein the chain length terminating agent is an aromatic monohydroxy compound.

14. Process for the production of heat-stable thermoplastic polycondensation products which comprises adding a solution of one mol terephthalic acid dichloride and one mol dimethyl-dichlorosilane in methylene chloride to a solution of two mols 2,2-bis(4-hydroxyphenyl)-propane in a mixture of methylene chloride and pyridine, standing the mixture for several hours at temperatures from about room temperature to about 400° C., neutralising it by shaking up with dilute hydrochloric acid and water, drying and distilling off the solvents.

15. Process for the production of heat-stable thermoplastic polycondensation products which comprises heating a mixture of two mols 2,2-bis(4-hydroxyphenyl)-propane, one mol dimethyl-diphenoxysilane, one mol terephthalic acid diphenylester and a trace of the sodium salt of 2,2-bis(4-hydroxyphenyl)-propane with stirring and passing through nitrogen under reduced pressure to a temperature from room temperature to about 400° C.

16. A heat-stable, thermoplastic, polycondensed mixed ester produced by a process defined in claim 1.

17. A coating composition comprising a heat-stable, thermoplastic, polycondensed mixed ester as defined in claim 16.

18. Process for the production of heat-stable thermoplastic polycondensation products which comprises heating a mixture of 4 mols 2,2-bis(4-hydroxyphenyl)-propane, 1 mol dimethyl-diphenoxy silane, 3 mols terephthalic acid diphenyl ester and a trace of the sodium salt of 2,2-bis(4-hydroxyphenyl)-propane with stirring and passing through nitrogen under reduced pressure.

19. Process for the production of heat-stable thermoplastic polycondensation products which comprises heating a mixture of 5 mols 2,2-bis(4-hydroxyphenyl)-propane, 1 mol dimethyl-diphenoxy silane, 4 mols terephthalic acid diphenyl ester and a trace of the sodium salt of 2,2-bis(4-hydroxyphenyl)-propane with stirring and passing through nitrogen under reduced pressure.

References Cited in the file of this patent
UNITED STATES PATENTS

| | | |
|---|---|---|
| 2,035,578 | Wagner | Mar. 31, 1936 |
| 2,628,215 | Hunter et al. | Feb. 10, 1953 |
| 2,843,560 | Mika | July 15, 1958 |